Patented Nov. 9, 1948

2,453,558

UNITED STATES PATENT OFFICE 2,453,558

PRINTING INK

Andries Voet, New York, N. Y., assignor to J. M. Huber, Incorporated, New York, N. Y., a corporation of New Jersey No Drawing. Application November 28, 1945, Serial No. 631,486

10 Claims. (Cl. 106—32)

This invention relates to printing ink, and, more particularly, to a printing ink which comprises a dispersion of pigment in mineral oils.

Printing inks for printing newspapers, and the like, generally comprise dispersions of pigments in mineral oil vehicles, the inks setting by penetration of the vehicle into the porous paper stock. Formally, the vehicles were dark colored oils which, however, had the disadvantage of staining, show through and strike through of the vehicle on the printed sheet. When it was attempted to use the lighter colored oils, such as the white oils, as vehicles in printing inks, it was found that the inks did not have satisfactory working qualities. It thus appeared that the dark oils naturally contained materials of a resinous or asphaltic character which produced the necessary working qualities in the inks. It was therefore found necessary to add resinous materials to the white oils in order to produce the desirable working qualities such as flow, tack, freedom from thixotrophy, wetting power and dispersing power, to the inks. Such resins are generally incorporated in part of the oil by a heat treatment to thereby form a varnish. The varnishes are then cut cold with the rest of the oil. This has required the establishment of separate plants requiring special equipment and handling to produce the varnish. Also, since resins are usually among the more expensive ingredients of such low priced inks, their cost has greatly limited their use and the use of the white oils as ink vehicles.

An object of the present invention is to produce new and improved printing inks. Another object is to produce printing inks of suitable flow characteristics from mineral oils of the character of white oils without the necessity of preparing a varnish in a separate plant. A further object is to provide printing inks containing novel polymeric materials having particularly effective dispersion properties for pigments. A still further object is to produce low cost inks of unusual good working characteristics, particularly from mineral oils free of naturally occurring resinous and asphaltic materials. Other objects are to advance the art. Still other objects will appear hereinafter.

The above and other objects may be accomplished in accordance with my invention, which comprises producing an ink comprising a pigment, a mineral oil vehicle, and from about 2% to about 20% of a petroleum polymer obtained by solvent extraction of solid adsorbents used in the refining of solid and semi-solid petroleum hydrocarbons. Such petroleum polymers are by-products of the petroleum industry and are readily available in large quantities at low cost. They are readily miscible with liquid petroleum hydrocarbons and are easily cut cold with mineral ink oils. They may be readily added directly to the oils without the necessity of first forming a varnish. They are unusually effective in improving the dispersion of pigments, and particularly carbon black, in oils, and produce unusually good working qualities in the oils.

Petroleum hydrocarbons, such as petrolatums, greases, and amorphous waxes which are solid or semi-solid at normal temperatures, are obtained by freezing out of crude oils. Such petroleum hydrocarbons are frequently refined by contacting them with solid adsorbents such as clay, Fuller's earth, bauxite and the like. It is well known that, during such treatment, certain reactions take place within the pores of the adsorbent whereby unsaturated compounds, naturally present in the petroleum product being refined, undergo polymerization. When the adsorbent becomes spent, it is regenerated by heating it with a solvent such as naphtha, benzene and the like, with or without admixture with polar assistants such as methanol. The solution is then separated from the adsorbent and the solvent recovered by distillation. The distillation of the solvent leaves a residue of petroleum polymer. It is this residue, or petroleum polymer, which is added to the pigment and mineral oil vehicle to produce the novel inks of my invention.

Such petroleum polymers are fluid at room temperatures but are of high molecular weight, having a molecular weight far in excess of the original monomers present in the petroleum stocks from which they are obtained. Their viscosity will vary within a wide range and will depend on the nature of the original petroleum stock from which they are obtained. The average amorphous waxes, for example, will yield petroleum polymer having a viscosity range of from about 200 seconds to about 250 seconds Saybolt at 210° F. They may be obtained from paraffinic base or naphthenic base crude oils. For best results in the compositions of my invention, the petroleum product is preferably obtained in the refinement of greases from paraffinic base Pennsylvania crude oils. A typical petroleum polymer was obtained by the solvent extraction of an adsorbent which had been used in the refining of a grease from paraffinic base Pennsylvania crude oil, and had the following properties:

| | |
|---|---|
| Saybolt viscosity at 210° F | 205 to 220 |
| Flash point (Cleveland Open Cup) | 500° minimum |
| Carbon residue (ASTM) | 8% maximum |
| Neutralization No | 0.10 maximum |
| Naphtha insoluble | 0.1% maximum |
| Carbon tetrachloride insoluble | 0.05% maximum |
| Color | Brown |

In order to more clearly illustrate my invention, the preferred mode of carrying the same into effect and the advantageous results to be obtained thereby, the following example is given:

EXAMPLE 1

Samples of ink were prepared from a white mineral oil having a viscosity of 0.80 poises by adding 10% by weight of carbon black and various per cents by weight of the petroleum polymer hereinbefore described. The viscosities were measured with a Brookfield synchrolectric viscometer at 80° F. The yield values, expressed in grams of plunger weight necessary to start flow, were determined at 80° F. with a standard Gardner Mobilometer with a 51 hole disc. The flow value, in each case, was measured as the distances in inches traversed in one minute by a volume of 1.3 milliliters of ink, which had been deposited in a hollow cup made in a glass plate, upon changing the position of the plate from a horizontal position to an angle of 71° with the horizontal. The results are shown in Table I.

Table I

| Per Cent Petroleum Polymer | Viscosity | Yield Value | Flow |
|---|---|---|---|
| 0 | 61 | 153 | 0 |
| 1 | 36.5 | 76 | 2.5 |
| 3 | 17.5 | 42 | 6.5 |
| 5 | 12.5 | 26 | 7.5 |
| 10 | 11.5 | 12 | 10 |

EXAMPLE 2

Inks were made from a refined commercial ink oil having a viscosity of 0.90 poises and an ASTM color of approximately 4, while being entirely free from resinous and asphaltic materials. These inks contained various amounts of petroleum polymer. The viscosities and yield values were determined at 80° F. The results are shown in Table II.

Table II

| Per Cent Petroleum Polymer | Viscosity in Poises | Yield Value Gram Weight |
|---|---|---|
| 0 | 39 | 132 |
| 1 | 30 | 82 |
| 3 | 23 | 53 |
| 5 | 17.5 | 44 |
| 10 | 13 | 40 |

From the above results, it is apparent that the incorporation of even small concentrations of the petroleum polymer, in accordance with my invention, results in a great and sudden change in rheological properties and a free-flowing, uniformly well-dispersed ink is formed which has excellent properties for printing, instead of a rather stiff, buttery dispersion, not very suitable for printing, which is obtained in the absence of the polymer.

The amount of petroleum polymer which may be incorporated in the oil, in accordance with my invention, may be widely varied but will usually be from about 2% to about 20% by weight of the oil. Increasing amounts of carbon black or other pigment in the oil, results in a mixture having a heavier body which requires the addition of increasing amounts of polymer to produce equivalent results. For example, in a news ink having a mineral oil base and containing from about 9% to about 14% by weight of carbon black, it will generally be preferred to add from about 3% to about 8% by weight of the petroleum polymer. For magazine news inks having a mineral oil base and containing from about 14% to about 20% by weight of the carbon black, it will generally be preferred to add from about 10% to about 20% by weight of the petroleum polymer. Still larger quantities of the polymer may be employed, if desired, but generally without substantial advantage.

The pigments employed in producing the inks of my invention may be any of those ordinarily employed in printing inks. However, my invention is particularly adapted to printing inks in which the pigment is carbon black.

While I have disclosed preferred embodiments of my invention, it will be understood that such embodiments are given for illustrative purposes solely, and many variations and modifications will be apparent to those skilled in the art without departing from the spirit or scope of my invention. For example, while I have disclosed the use of my invention in preparing inks from specific mineral oils, it will be apparent that other oils may be used. Mineral oils, which have been refined so as to remove substantially all of the naturally occurring resinous and asphaltic materials, are equivalent to the oils of the examples and will be improved similarly when used in inks in accordance with my invention. The dark colored oils, containing naturally occurring resinous and asphaltic materials, may also be used, and the addition of the petroleum polymer thereto will produce improvement therein, but to a lesser extent. Also, the mineral oil vehicle may contain the various resinous, asphaltic and surface-active materials frequently incorporated in printing inks.

The inks of my invention have exceptionally good printing characteristics. The use of the petroleum polymer in mineral oils free of resinous and asphaltic materials produces inks of superior quality. Since neither resins nor varnishes are required, my invention makes it possible to produce excellent inks at an unusually low cost. Furthermore, the vehicles containing the petroleum polymers, in accordance with my invention, are particularly well suited as grinding media, as dispersion of the carbon black takes place more easily and completely than with other vehicles of similar viscosity.

I claim:

1. An ink consisting essentially of a pigment, a mineral oil vehicle, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon which is a member of the group consisting of petrolatums, greases and amorphous waxes.

2. An ink consisting essentially of carbon black, a mineral oil vehicle, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon which is a member of the group consistsing of petrolatums, greases and amorphous waxes.

3. An ink consisting essentially of a pigment, a mineral oil vehicle free of naturally occurring resinous and asphaltic materials, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon which is a member of the group consisting of petrolatums, greases and amorphous waxes.

4. An ink consisting essentially of carbon black, a mineral oil vehicle free of naturally occurring resinous and asphaltic materials, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon which is a member of the group consisting of petrolatums, greases and amorphous waxes.

5. An ink comprising from about 9% to about 20% by weight carbon black, from about 89% to about 60% by weight of a mineral oil free of naturally occurring resinous and asphaltic materials, and from about 2% to about 20% by weight of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon which is a member of the group consisting of petrolatums, greases and amorphous waxes.

6. An ink consisting essentially of a pigment, a mineral oil vehicle, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon from a paraffinic base crude oil, which hydrocarbon is a member of the group consisting of petrolatums, greases and amorphous waxes.

7. An ink consisting essentially of carbon black, a mineral oil vehicle, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon from a paraffinic base crude oil, which hydrocarbon is a member of the group consisting of petrolatums, greases and amorphous waxes.

8. An ink consisting essentially of a pigment, a mineral oil vehicle free of naturally occurring resinous and asphaltic materials, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon from a paraffinic base crude oil, which hydrocarbon is a member of the group consisting of petrolatums, greases and amorphous waxes.

9. An ink consisting essentially of carbon black, a mineral oil vehicle free of naturally resinous and asphaltic materials, and from about 2% to about 20% by weight based on the oil of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon from a paraffinic base crude oil, which hydrocarbon is a member of the group consisting of petrolatums, greases and amorphous waxes.

10. An ink comprising from about 9% to about 20% by weight carbon black, from about 89% to about 60% by weight of a mineral oil free of naturally occurring resinous and asphaltic materials, and from about 2% to about 20% by weight of a petroleum polymer which is fluid at room temperatures, has a viscosity of from about 200 seconds to about 250 seconds Saybolt at 210° F. and is obtained by solvent extraction of solid adsorbents used in the refining of a petroleum hydrocarbon from a paraffinic base crude oil, which hydrocarbon is a member of the group consisting of petrolatums, greases and amorphous waxes.

ANDRIES VOET.

REFERENCES CITED

The following references are of record in the file of this patent:

UNITED STATES PATENTS

| Number | Name | Date |
| --- | --- | --- |
| 1,869,608 | Miller | Aug. 2, 1932 |
| 2,154,089 | Hilman | Apr. 11, 1939 |
| 2,325,297 | Barmeier | July 27, 1943 |

FOREIGN PATENTS

| Number | Country | Date |
| --- | --- | --- |
| 312,745 | Great Britain | June 6, 1929 |

OTHER REFERENCES

Page 221 of "Printing Inks" by Ellis (1940).